United States Patent [19]
Proctor, Jr. et al.

[11] Patent Number: 5,960,047
[45] Date of Patent: Sep. 28, 1999

[54] SYSTEM AND METHOD FOR TRANSMITTING INFORMATION SIGNALS

[75] Inventors: James Arthur Proctor, Jr., Los Gatos, Calif.; James Carl Otto, Melbourne, Fla.

[73] Assignee: Harris Corporation, Melbourne, Fla.

[21] Appl. No.: 08/968,214

[22] Filed: Nov. 12, 1997

Related U.S. Application Data

[63] Continuation of application No. 08/315,345, Sep. 30, 1994, Pat. No. 5,687,196.

[51] Int. Cl.$^6$ ................................. H04B 7/10; H04L 1/02
[52] U.S. Cl. ......................... 375/347; 375/208; 455/132
[58] Field of Search .................................. 375/200, 204, 375/208, 240, 295, 347; 455/132

[56] References Cited

U.S. PATENT DOCUMENTS

| | | | |
|---|---|---|---|
| 5,022,046 | 6/1991 | Morrow, Jr. ............................. | 375/200 |
| 5,640,385 | 6/1997 | Long et al. ............................. | 370/335 |
| 5,687,196 | 11/1997 | Proctor, Jr. ............................. | 375/347 |
| 5,748,667 | 5/1998 | Kumar ..................................... | 375/285 |
| 5,761,238 | 6/1998 | Ross et al. ............................. | 375/200 |
| 5,774,493 | 6/1998 | Ross ......................................... | 375/206 |

*Primary Examiner*—Chi H. Pham
*Assistant Examiner*—Bryan Webster
*Attorney, Agent, or Firm*—Rogers & Killeen

[57] ABSTRACT

A system and method for transmitting information in which a relatively narrowband signal is transmitted followed by the transmission of a relatively wideband signal. The narrowband signal may be used by the receiver to alert the receiver to the upcoming wideband signal. In a system in which the transmissions occur asynchronously to the receiver, the receiver may be less complicated because the receiver is provided with an indication of the time and/or the center frequency of the wideband signal. Either the narrowband signal or the wideband signal may be used to transmit information from the transmitting device to the receiver. The system and method find particular advantage in tracking and locating systems in which a plurality of tags asynchronously transmit information and/or location information to a receiver or a set of receivers.

13 Claims, 2 Drawing Sheets

SYSTEM AND METHOD FOR TRANSMITTING INFORMATION SIGNALS

RELATED APPLICATIONS

This application is a continuation-in-part application of U.S. patent application Ser. No. 315,345 filed Sep. 30, 1994 and issued Nov. 11, 1997 entitled "Range and Bearing Tracking System With Multipath Rejection" and assigned to the same assignee as the present invention.

BACKGROUND OF THE INVENTION

The present invention is related generally to systems and methods for determining the range and bearing of the source of radiofrequency ("RF") signal and, in particular, to systems and methods for determining the range and bearing of such signals in the face of multipath and similar noise sources.

Systems and method for determining the distance and bearing of an RF signal are well known. In some systems, a outbound signal having a known power is sent from a base station to a remote station at an unknown location. The remote station may "respond" to the signal from the base station by returning a signal upon receipt of the outbound signal. Such a system is presently produced by Cubic Defense Systems, Inc. as the AN/ARS-6(V) PLS system or by Rockwell International Inc as the Target Locating System (TLS). The distance between the base station and the remote station may be determined by any of the known methods. For example, the distance can be computed by timing the total transit time between the transmission of the outbound signal and the receipt of the response signal. By subtracting the estimated time of the delay in the remote station from the total transit time, the time to traverse twice the distance between the base and the remote stations can obtained and the distance readily computed. By way of another example of prior art systems, the distance between the base and the remote stations can be estimated by knowing the power of the signal transmitted from the remote and measuring the power of the signal received at the base station. Using the inverse square law of signal strength over increasing distances, an estimate of the distance can be obtained from the difference between the transmitted power and the received power.

Likewise, it is known in the prior art to determine the direction of the response signal by one of many techniques. For example, in one of the most simple methods, a loop antenna may be rotated and the strength of the response signal measured. The transmitting station is estimated to be along the line corresponding to the axis of the loop when the loop is position to maximize response signal power. In another example in the prior art, a base station may use plural antennas having a known geometric relationship to one another. The angle of arrival of the response signal may be determined by evaluating the phase of the response signal simultaneously at each of the antennas. The simultaneous phase relationships at the antennas, the geometric relationship of the antennas and the frequency of the response signal can be used to estimate the angle of arrival of the response signal with respect to the antennas.

All of the above-noted systems and methods for determining range and bearing in the prior art experience some difficulty in multipath and other noisy environments typical of where many such tracking and ranging systems are used. For example, with reference to FIG. 1, an RF signal source 10 may be located at location remote and unknown to a base station 12. Plural blocking and/or reflecting elements 14, such as buildings, towers, mountains may exist in the proximity of and in the direct path between the RF signal source 10 and the base station 12. The blocking and/or reflecting elements cause RF signals impinging upon such elements to be blocked, absorbed, reflected, and often a combination of all three. Generally, such elements cause RF signals to be diminished in strength and to change direction. When a source of RF signals such as the remote source 10 radiates RF signals, such signals are blocked and/or reflected by the elements 14 such that instead of a single signal arriving at the base station 12, multiple versions of the same or slightly altered signal arrive at the base station 12. The different versions of the signals arrive at different times because they have travelled different paths of different distances than either the direct version or other indirect versions. The signals may also be altered from one another because each of the signals has experienced a different environment and may have been subject to different noise and interference sources along the different paths.

With continued reference to FIG. 1, in a multipath environment, the signal which arrives directly from the RF signal source 10 at the base station 12 may not be the strongest signal. For example, in the system of FIG. 1 three different paths 20, 22, and 24 between the RF signal source 10 and the base station 12 are shown. (It being understood that generally communications are conducted across an arc and not just at selected lines from the RF signal source.) The first signal path 20 proceeds directly from the RF signal source 10 to the base station 12. Because the first signal path intersects two of the elements, and each element tends to diminish the strength of the signal, the signal arriving at the base station 12 is lower in amplitude or power than a signal arriving without being partially absorbed. Note that when the signal on the first signal path impinged on the elements, it is likely that some portion of the signal was reflected and some portion was refracted and never reached the base station 12 but such reflection and refraction are not shown with respect to the first signal path 20 for simplicity of illustration.

The second signal path 22 in the illustration of FIG. 1 is reflected off two of the elements 14 before reaching the base station 12 (refraction and absorption not being shown). If the reflecting surfaces of these two elements are relatively efficient, a relatively strong signal will reach the base station 12 along the second signal path 22. Because the signal traveling the second signal path 22 travelled a longer distance than the signal travelling the first signal path 20, the signal on the second path will arrive at the base station 22 after the signal on the first signal path 20. Similarly, the third signal path 24 is reflected off an element 14 to reach the base station 12.

Note that in the system of FIG. 1, the various signals arrive at the base station from entirely different angles. In some systems in the prior art, the locating system will operate on the signal having the strongest signal power. As can be seen from the illustration in FIG. 1, such a procedure will lead to an erroneous result as the signal amoving with the strongest power arrives along the second signal path 22, from almost the very opposite of the actual angle to the RF signal source. Note also that if ranging is done on the basis of the strongest signal, the ranging determination will be in error because the strongest (second signal path 22) travels more distance than the distance between the RF signal source 10 and the base station 12.

The influences of multipath signals on distance and angle location has been recognized in the prior art. Some prior art systems ignore the influence of multipath by utilizing a composite signal based on the strengths of the various multipath signals identified by the base station 12. The systems of FIG. 1 illustrate how the composite signal may be erroneous as signal which is the composite of the arriving signals may yield a signal which is misaligned such as the composite signal 26. As can be seen from the illustration, the direct signal path (first signal path 20) will yield the best "direction" information but the "composite" signal 26 received by the base station is a combination of signals from different angles of arrival.

It is accordingly an object of the present invention to provide a novel system and method of tracking a remote RF transmitter which obviates these and other known problems in the prior art.

It is a further object of the present invention to provide a novel system and method of tracking a remote RF transmitter which has a reduced susceptibility to the effects of multipath.

It is another object of the present invention to provide a novel system and method of tracking a remote RF transmitter by determining the range and direction of an arriving signal with respect to the portion of the signal arriving directly from the RF transmitter.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
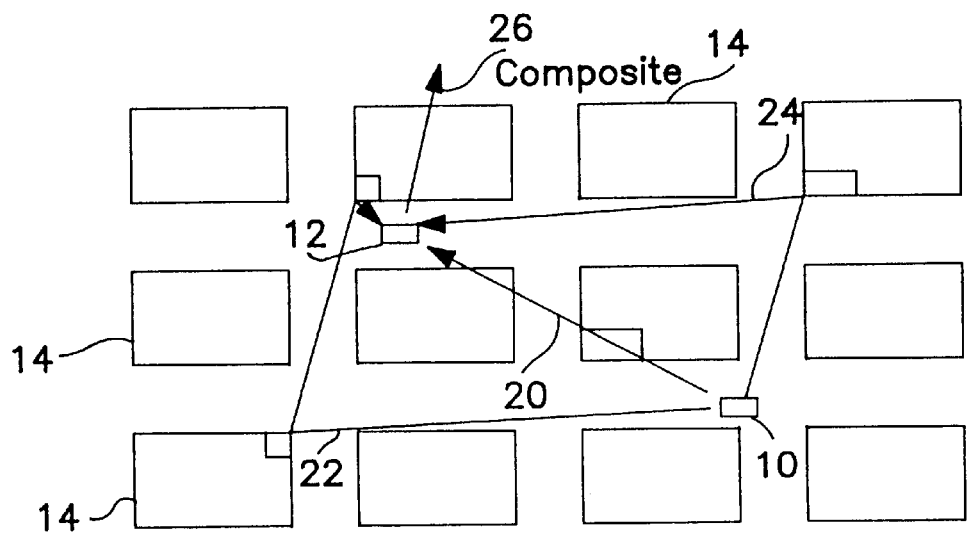
FIG. 1 is a pictorial representation of a typical environment in which RF tracking is accomplished, showing the various signal paths.
Figure 2:
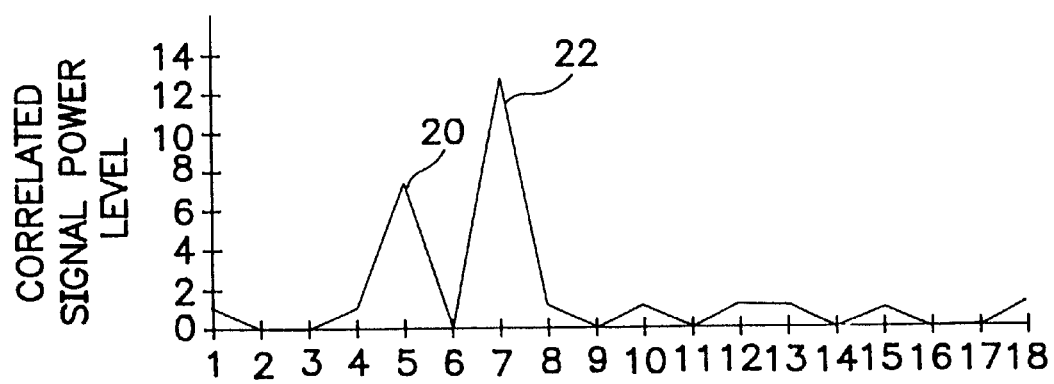
FIG. 2 is a signal power level graph showing the correlations of signal power in a typical multipath signal.

The principles of operation of the present invention can be described with reference to the correlated signal power level graph of FIG. 2. The graph of FIG. 2 depicts the correlated power level of the signal received plotted against time starting from the time of transmission of the signal. In a typical multipath environment, such as shown in the illustration of FIG. 1, the signal power level may have several peaks, each peak corresponding to the arrival of a signal which has taken a different route. For example, in FIG. 2, the first peak could correspond to the signal traveling along the first signal path 20 of FIG. 1, the second peak could correspond to the signal travelling along the second signal path 22 of FIG. 1, et cetera. Note that in the graph of FIG. 2, the "strongest" signal corresponds to the signal travelling on the second signal path 22 and that this is a multipath signal, not the signal arriving directly from the transmitter. Rather, the signal arriving directly from the transmitter is the first signal having a significant peak, the signal travelling along the fist signal path 20. The first arriving signal in this example is weaker than the later arriving signal because the signal was attenuated by passing through the blocking elements 14 illustrated in FIG. 1. Because the "shortest distance between two points is a straight line" and the speed of transmission of the signal through various media is approximately equal, the signal travelling directly from the transmitter to the base station will always be the first signal to arrive (assuming that the signal is not wholly blocked.) The present invention takes advantage of the fact that the first arriving signal is the signal which has travelled the shortest distance and is most likely the signal corresponding to the direct path to the transmitter by selecting this signal from which to determine the range to and angle of arrival from the remote transmitter.

Figure 3:
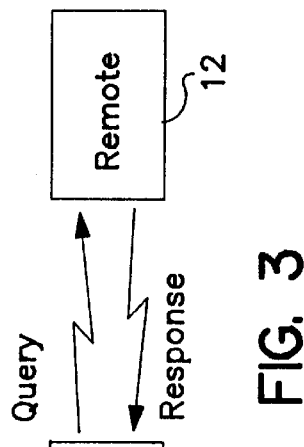
FIG. 3 is a simplified block diagram of a system in which the present invention may be used.

With reference to FIG. 3, the present invention may be embodied in a tracking and locating system in which a base station 10 transmits a signal to a remote unit 12 which relays the signal back to the base station 10. The signal may be a spread spectrum signal, such as a chirp signal. By determining the round trip time and subtracting the known delay within the remote unit 12 and within the base station's detection system, the propagation time is determined and the distance may be calculated. In a preferred embodiment, the base station's receiver is a conventional correlation receiver in which the power level of the arriving signal is correlated in time and the signal arriving first in time is used to determine the total propagation time and angle of arrival.

Figure 4:
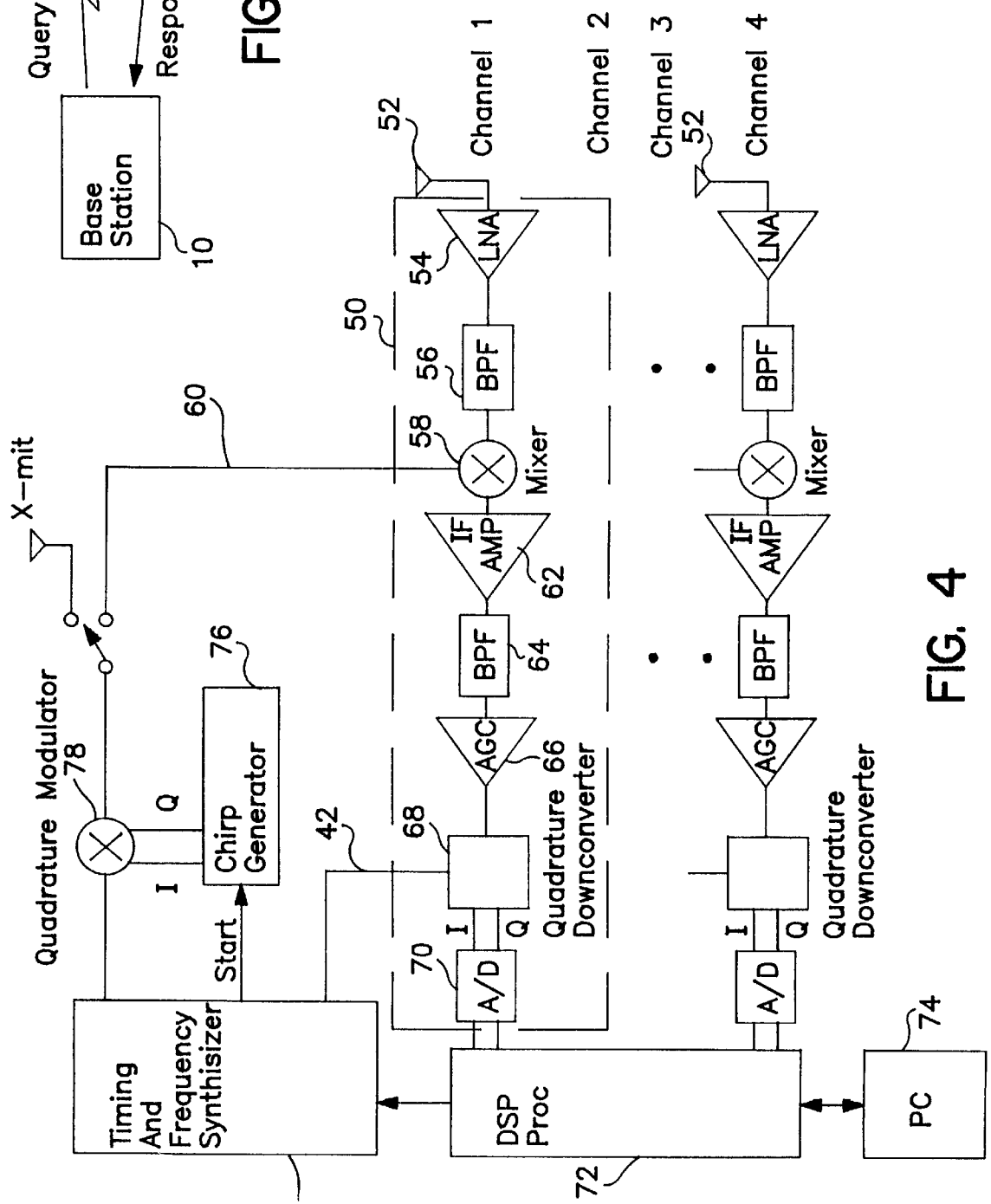
FIG. 4 is a simplified block diagram of another embodiment of a device in which the method of the present invention can be implemented.

With reference to FIG. 4, the present invention may be embodied in a direction finding unit having multiple channels 50, each channel being associated with a different antenna 52 (or element in a plural element antenna array). The geometric relationship of the plural antennas 52 is known to the DF unit. Each of the channels 50 may include a low noise amplifier 54 and a bandpass filter 56 which provides the received signal to a mixer 58 which mixes the received signal with a locally generated signal 60. The mixed signal may then be amplified by an intermediate frequency amplifier 62, further filtered by a bandpass filter 64 and adjusted by a gain control circuit 66. The mixed signal may then be applied to a quadrature downconverter which down converts the mixed signal to baseband. The baseband signal may be converted by an analog-to-digital ("A/D") converter 70 to a digital signal which is supplied to a digital signal processor ("DSP") 72. The DSP 72 may be under the control of a small logic device, such as a personal computer 74, which determines the angle and direction of the remote transmitter from the DSP and provides and appropriate display or announcement to a user (not shown).

In the preferred embodiment, it has been found advantageous for the remote transmitter to transmit a signal having two portions, the first portion being a preamble which alerts the base station that the signal is arriving and indicates to the receiver that it should begin receiving. The second portion of the transmitted signal may be a chirp waveform, i.e., a waveform in which the frequency is varied, usually at a linear rate, for a period of time. The transmitted signal may be generated remotely at the transmitter or may be a replay of a signal originally sent by the base station.

Use of a chirp waveform has several advantages in the present invention because of a useful property of mixed chirp signals. It is known that if two identical chirp signals, one time delayed from the other, are mixed, the resulting signal will be a sinusoidal signal with a frequency which is directly proportional to the amount of delay between the two signals.

In operation, when the transmitted signal is received at the base station, it is detected by the receiver which recognizes the preamble and starts a chirp generator 76 which modulates a quadrature modulator 78 to provide an RF chirp signal as the locally generated signal 60 on the mixer input. When the RF chirp signal is mixed with the chirp signals arriving from the remote transmitter (i.e., several time delayed versions of the transmitted chirp signal), a set of sinusoidal signals is generated whose frequencies are proportional to the time they arrived. Thus, after the mixing, the signals in each channel represent the multipath profile of the received signal in the frequency domain. In the present invention, the mixing is accomplished at an intermediate frequency and then the frequency spectrum of signals is further downconverted by the quadrature downconverter 68 to baseband. The signal may then be digitized by the A/D converter and the digitized form of the signal applied to a multichannel DSP 72 which may use conventional techniques (such as a fast Fourier Transform) to determine the spectrum of frequencies at which signal energy is significantly present so that a power level profile may be developed. The PC 74 may review the power level profiles developed by the DSP for all the channels 50 to determine which signal arrived first. Because the relative phase relationships among the signals have been preserved and the PC 74 has been provided with the geometric relationships between the various channels, the PC 74 may conventionally determine the angle of arrival of the first arriving signal.

The filtering and amplifying elements of the DF unit of FIG. 4 may be conventional. The DSP 72 may be a commercially available device such as the TMS 320 C 30 device sold by Texas Instruments.

While not critical to the invention, in one embodiment, an acceptable signal from the transmitter had a center frequency of 915 MHz with a chirp of +/−10 MHz for a duration of approximately 10 millisec. The locally generated (reference) RF chirp used to downconvert to an intermediate frequency may be a signal having a center frequency of 880 MHz.

In the foregoing description, for ease of understanding, the elements of the system have been referred to as "base" and "remote". However, there is nothing critical to the present invention that requires one of the stations be fixed and the other mobile. Additionally, the detailed description may suggest that certain components may be utilized to construct a system of the present invention. However, that suggestion is not to be taken as limiting as it is known that many other components could be utilized to accomplish the same results. For example, the FFT 74 could be replaced by a bank of bandpass filters and appropriate detectors, each measuring the power level of the signal at different frequency ranges. Similarly, while the above description utilizes plural channels 50, the invention could be readily implemented using a single channel which is appropriately multiplexed to the various antennas.

In an alternative embodiment, a system in accordance with the present invention may utilize a remote unit which is not responsive to a signal from a base station. Rather, in another embodiment, a remote unit in a system in accordance with the present invention may send identifying information to a base station 10 without regard to any signal timing at the base station 10. For example, the remote unit 12 may send a signal to the base station periodically on a period based wholly on the remote unit 12. Still another example of such a remote unit may be a remote unit which transmits information to a base station 10 upon the occurrence of an independent event (such as a local occurrence at the remote unit 12) or at the random instance of the user of a remote unit 12 (used as a "panic button" for example). A more complete description of a system in which the remote unit 12 may send a signal (possibly with additional information) to a base unit 10 asynchronously to the base unit 10 and of methods and systems for providing and receiving such signals are contained in co-pending patent applications owned by the assignee hereof, specifically: U.S. patent application Ser. No. 08/708,031, filed Aug. 30, 1996, entitled "A System and Method For Communicating With Plural Remote Transmitters"; U.S. patent application Ser. No. 08/706,909, filed Aug. 30, 1996, entitled "A System and Method For Determining the Geolocation of a Transmitter"; U.S. patent application Ser. No. 08/705,831, filed Aug. 30, 1996, entitled "System and Method for Geolocating Plural Remote Transmitters"; U.S. patent application Ser. No. 08/708,030, filed Sep. 3, 1996, entitled "A System and Method for Communicating and/or Geolocating Plural Remote Transmitters Using a Time Invariant Matched Filter"; each of which is incorporated herein by reference.

When the signal being transmitted by the remote unit 12 is both asynchronous to the base unit and has a wide bandwidth (such as a spread spectrum signal), the task of receiving and decoding the signal at the base unit 10 becomes quite complex. For a base unit 10 to correctly find a spread spectrum signal when the signal arrives at a time which is unknown to the base station generally requires a receiver and decoder which utilizes many stages in correlating the received signal and which utilizes many computational cells. The complexity of the receiver may be increased greatly if the remote unit is transmitting a relatively short message.

One solution to the problem of decoding a asynchronous spread spectrum signal is to provide a relatively long preamble which increases the probability that the signal will be successfully correlated and acquired. Other solutions include complex, multi-stage correlators or the uses of expensive and redundant parallel processors. Generally, the more unknown is the time of arrival of the spread spectrum signal, the more complexity is required in a conventional tracking receiver.

In conventional location determination systems and in the first embodiment of the present invention, the spread spectrum burst is sent in response to a polling signal from a transmitter which is synchronized with the tracking receivers. Thus, in such systems, the receivers are provided with a rough estimate of when to expect the spread spectrum signal. Generally, this allows for a relatively simple implementation of the correlator required for accurate time of arrival measurement. If the expected time of arrival of the spread spectrum signal is not known, the receiver becomes much more complicated, with receiver complexity being roughly proportional to the time uncertainty to be searched.

In another embodiment of the present invention, a tracking and location system can be implemented wherein the target is not polled and which transmits asynchronously with its tracking receivers. Such a system has particular advantages because the target does not need to receive a signal, reducing its size, its complexity and its power consumption. Such a system can be particular useful in tracking mobile objects where the cost of the target system is particularly sensitive. In this alternative embodiment, however, the tracking receivers are provided with no reasonable time estimate of when a particular target may be sending information. Thus, the tracking receivers of this embodiment will usually search the appropriate spectrum continuously.

In searching the applicable spectrum, since the receivers in this alternative embodiment of the present invention are not provided with an estimate of the arrival times of the signals from the various targets, the complexity of the receivers would increase substantially unless other means are provided to reduce the receiver complexity. In this alternative embodiment, the complexity of the receivers is reduced by utilizing a signaling technique in which the targets first send a relatively narrowband signal and then send a relatively wideband signal. The narrowband signal is used primarily for alerting the receiver that the particular target is about to send a wideband signal. The receiver, having been alerted by the receipt of the narrowband signal, can thereupon detect the wideband signal much more readily because the wideband signals follows in a known timed relationship to the narrowband signal. Note that the timed relationship need not be exact; however, as set forth above, the more precise the timed relationship between the signals, the more simplistic can be the decoding logic of the receiver.

In this alternative embodiment of the present invention, the wideband spread spectrum signal is preceded by a narrowband synchronizing signal which can be received by a relatively simple time invariant matched filter. Because the complexity of the tracking receiver is generally proportional to the bandwidth of the signal being detected, particularly for a asynchronous signals, a narrowband signal with a large time uncertainty or an unknown expected time of arrival can be detected with a relatively simple receiver. In a receiver of the present invention, the receiver continuously looks for the characteristic narrowband signal (and may use a relatively simple time invariant matched filter to do so). Once the narrowband signal is detected, a wideband portion of the receiver can be enabled and used to detect the subsequent wideband signal. Since the receiver has a rough estimate of the time of arrival of the wideband signal, the complexity of the receiver can be reduced from that which would otherwise be required to acquire the wideband signal if the time of arrival were unknown.

Another advantage of this alternative embodiment of the present invention is the ability of the narrowband signal to provide information concerning the center frequency of the wideband signal. In most direct signal sequence spread spectrum correlators, the center frequency of the spread spectrum signal must be known relatively precisely. In conventional spread spectrum receivers, the center frequency of the received signal is not known sufficiently accurately and such receivers often utilize parallel channels for receiving and decoding the signals, each channel dealing with a slightly different frequency offset (from the expected frequency) to overcome the frequency uncertainty. Another advantage is that the narrowband signal may transmit information such as the transmitter identifier, status, or control information. In such instances, the wideband signal may also carry data or may only provide a means for accurately determining the location of the transmitter, or both.

In the present invention, the frequency of the narrowband signal can be related to the center frequency of the wideband signal. Thus, when the relatively simple narrowband receiver detects the narrowband signal, both the timing of and the center frequency of the wideband signal can be provided to the wideband portion of the receiver. With knowledge of both the expected arrival time and the center frequency of the wideband signal, the wideband portion of the receiver can be made more simple and straightforward.

In a preferred embodiment, the waveform of the spread spectrum signal is a pseudo-random direct spread spectrum signal (PSK modulated with a pseudo-random sequence). In a preferred embodiment, the synchronizing signal can also be a direct spread sequence signal but at a significantly lower chip rate.

The waveforms of the spread spectrum signal may be any conventional spreading waveforms, including without limitation, frequency hop signals, pseudo-random direct sequence signals, chirp signals, or a hybrid of each of the foregoing signals. Similarly, the synchronizing signal waveform may be any conventional signal (including a spread spectrum signal), including without limitation, a continuous wave signal, a direct sequence signal, a chirp signal, a frequency hop signal, or a hybrid of any of these signals.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for communicating information comprising the steps of:
   a. encoding information to be communicated,
   b. generating a first signal which includes said encoded information;
   c. at a transmitter, transmitting an alerting signal, said alerting signal having a bandwidth less than said first said signal;
   d. at said transmitter, transmitting said generated first signal in timed relationship to and after the transmitting of said alerting signal
   e. receiving said transmitted first signal at a receiver; and
   f. determining the location of the transmitter of said received first signal from one or more of the time of arrival of said received first signal at the receiver and the angle of arrival of said received first signal at the receiver.

2. The method of claim 1 wherein said generated first signal is a spread spectrum signal.

3. The method of claim 2 wherein said generated first signal is one of a frequency-hopping signal, a pseudo-random direct sequence signal a chirp signal, and a hybrid of any of said signals.

4. The method of claim 2 wherein said alerting signal has a bandwidth which is less than the bandwidth of the generated first signal.

5. The method of for communicating information comprising the steps of:
   a. encoding information to be communicated,
   b. generating a first signal which includes said encoded information;
   c. at a transmitter, transmitting an alerting signal, said alerting signal having a bandwidth less than said first said signal;
   d. at said transmitter, transmitting said generated first signal in timed relationship to and after the transmitting of said alerting signal;
   e. receiving said alerting signal at a receiver;
   f. upon receipt of said alerting signal, receiving said generated first signal at the receiver;
   g. decoding said received first signal based in part on the time of receipt of said alerting signal; and,
   h. determining the location of the transmitter of said received first signal from one or more of the time of arrival of said received first signal at the receiver and the angle of arrival of said received first signal at the receiver.

6. The method of claim 5 further comprising the step of:
   i. decoding said received first signal based, in part, on the frequency of said received alerting signal.

7. The method of claim 5 further comprising the step of:

j. decoding said received first signal based, in part, on information contained within said received alerting signal.

8. The method of claim 2 wherein said transmitting of an alerting signal is performed asynchronously to an intended receiving system.

9. The method of claim 1 wherein said alerting signal has a bandwidth which is less than one-tenth the bandwidth of the generated first signal.

10. The method of claim 1 wherein said alerting signal includes information signals.

11. The method of claim 10 wherein said information signals include one or more of an identification of the transmitter, a measurement taken in association with the transmitter, and data provided by the user at the transmitter.

12. The method of claim 1 wherein the first signal includes information signals.

13. The method of claim 12 wherein said information signals comprise one or more of an identification of the transmitter, a measurement taken in association with the transmitter, and data provided by the user at the transmitter.

* * * * *